(12) United States Patent
Arakelian et al.

(10) Patent No.: US 10,031,794 B1
(45) Date of Patent: Jul. 24, 2018

(54) MESSAGE GENERATION SYSTEM AND METHOD

(71) Applicant: EMC Corporation, Hopkinton, MA (US)

(72) Inventors: Mark Arakelian, Shirley, MA (US); Michael McCarthy, Mansfield, MA (US); Steven Teng, Littleton, MA (US); Jeff Phillips, Northbridge, MA (US); Matthew Eaton, Mansfield, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 122 days.

(21) Appl. No.: 14/755,746

(22) Filed: Jun. 30, 2015

(51) Int. Cl.
G06F 11/07 (2006.01)

(52) U.S. Cl.
CPC ........ *G06F 11/0772* (2013.01); *G06F 11/079* (2013.01); *G06F 11/0709* (2013.01); *G06F 11/0751* (2013.01)

(58) Field of Classification Search
CPC ............................ G06F 11/0766; G06F 11/327
USPC ............................................................ 714/57
See application file for complete search history.

(56) References Cited

U.S. PATENT DOCUMENTS

| | | | | |
|---|---|---|---|---|
| 3,768,074 A * | 10/1973 | Sharp | ................. | G06F 11/2023 710/100 |
| 8,732,411 B1 * | 5/2014 | Chatterjee | ............. | G06F 3/0641 711/147 |
| 8,838,539 B1 * | 9/2014 | Ashcraft | ................. | H04L 67/02 707/637 |
| 9,274,903 B1 * | 3/2016 | Garlapati | ............ | G06F 11/2002 |
| 2003/0220719 A1 * | 11/2003 | Jiang | ........................ | G06F 1/12 700/286 |
| 2006/0101214 A1 * | 5/2006 | Mikami | .............. | G06F 11/2058 711/162 |
| 2006/0168154 A1 * | 7/2006 | Zhang | ................. | G06F 11/1662 709/220 |
| 2006/0265272 A1 * | 11/2006 | Bosa | ................ | G06Q 10/06375 705/7.37 |
| 2009/0240867 A1 * | 9/2009 | Shibayama | ........... | G06F 3/0605 711/100 |
| 2011/0246526 A1 * | 10/2011 | Finkelstein | ....... | G06F 17/30286 707/784 |
| 2012/0284252 A1 * | 11/2012 | Drai | .................. | G06F 17/30864 707/709 |
| 2013/0018987 A1 * | 1/2013 | Seaman | .............. | H04L 67/1095 709/218 |
| 2014/0237306 A1 * | 8/2014 | Kabakura | ........... | H04L 41/0677 714/712 |
| 2015/0169396 A1 * | 6/2015 | Tsyganok | ............ | H04L 43/0823 714/704 |

(Continued)

*Primary Examiner* — Chae M Ko
(74) *Attorney, Agent, or Firm* — Brian J. Colandreo; Heath M. Sargeant; Holland & Knight LLP

(57) ABSTRACT

A method, computer program product, and computing system for monitoring the availability of multiple redundant data sources within a high-availability data environment. The inaccessibility of at least one of the multiple redundant data sources is detected, thus defining at least one inaccessible data source. Which software applications are impacted by the at least one inaccessible data source is determined, thus defining at least one impacted software application. A notification is provided to one or more parties associated with the at least one impacted software application concerning the inaccessibility of the at least one inaccessible data source.

17 Claims, 4 Drawing Sheets

(56) References Cited

U.S. PATENT DOCUMENTS

2015/0227416 A1\* 8/2015 Reinart ............ G06F 17/30082
 714/763
2016/0162378 A1\* 6/2016 Garlapati ............ G06F 11/2002
 714/4.12

\* cited by examiner

MESSAGE GENERATION SYSTEM AND METHOD

TECHNICAL FIELD

This disclosure relates to message generation systems and, more particularly, to message generation systems for use within data storage systems.

BACKGROUND

Storing and safeguarding electronic content is of paramount importance in modern business. Accordingly, various data storage systems may be employed to protect such electronic content. Unfortunately, in the event of a malfunction of such a data storage system, the user is often presented with a cryptic message that does not clearly explain to the user how the malfunction of the data storage system may impact any applications being utilized by the user.

SUMMARY OF DISCLOSURE

In one implementation, a computer-implemented method is executed on a computing device. The computer-implemented method includes monitoring the availability of multiple redundant data sources within a high-availability data environment. The inaccessibility of at least one of the multiple redundant data sources is detected, thus defining at least one inaccessible data source. Which software applications are impacted by the at least one inaccessible data source is determined, thus defining at least one impacted software application. A notification is provided to one or more parties associated with the at least one impacted software application concerning the inaccessibility of the at least one inaccessible data source.

One or more of the following features may be included. The one or more parties associated with the at least one impacted software application may include one or more of: a user of the impacted software application; an administrator of the impacted software application; an administrator of the at least one inaccessible data source; and an administrator of the high-availability data environment. The notification may include one or more data preservation recommendations concerning the at least one impacted software application. The notification may define how the at least one inaccessible data source impacts the at least one impacted software application. The multiple redundant data sources may be accessible via one or more virtual machine systems operating within the high-availability data environment. At least one of the multiple redundant data sources may be a LUN within the high-availability data environment. The multiple redundant data sources may be located in different data centers within the high-availability data environment.

In another implementation, a computer program product resides on a computer readable medium and has a plurality of instructions stored on it. When executed by a processor, the instructions cause the processor to perform operations including monitoring the availability of multiple redundant data sources within a high-availability data environment. The inaccessibility of at least one of the multiple redundant data sources is detected, thus defining at least one inaccessible data source. Which software applications are impacted by the at least one inaccessible data source is determined, thus defining at least one impacted software application. A notification is provided to one or more parties associated with the at least one impacted software application concerning the inaccessibility of the at least one inaccessible data source.

One or more of the following features may be included. The one or more parties associated with the at least one impacted software application may include one or more of: a user of the impacted software application; an administrator of the impacted software application; an administrator of the at least one inaccessible data source; and an administrator of the high-availability data environment. The notification may include one or more data preservation recommendations concerning the at least one impacted software application. The notification may define how the at least one inaccessible data source impacts the at least one impacted software application. The multiple redundant data sources may be accessible via one or more virtual machine systems operating within the high-availability data environment. At least one of the multiple redundant data sources may be a LUN within the high-availability data environment. The multiple redundant data sources may be located in different data centers within the high-availability data environment.

In another implementation, a computing system including a processor and memory is configured to perform operations including monitoring the availability of multiple redundant data sources within a high-availability data environment. The inaccessibility of at least one of the multiple redundant data sources is detected, thus defining at least one inaccessible data source. Which software applications are impacted by the at least one inaccessible data source is determined, thus defining at least one impacted software application. A notification is provided to one or more parties associated with the at least one impacted software application concerning the inaccessibility of the at least one inaccessible data source.

One or more of the following features may be included. The one or more parties associated with the at least one impacted software application may include one or more of: a user of the impacted software application; an administrator of the impacted software application; an administrator of the at least one inaccessible data source; and an administrator of the high-availability data environment. The notification may include one or more data preservation recommendations concerning the at least one impacted software application. The notification may define how the at least one inaccessible data source impacts the at least one impacted software application. The multiple redundant data sources may be accessible via one or more virtual machine systems operating within the high-availability data environment. At least one of the multiple redundant data sources may be a LUN within the high-availability data environment. The multiple redundant data sources may be located in different data centers within the high-availability data environment.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
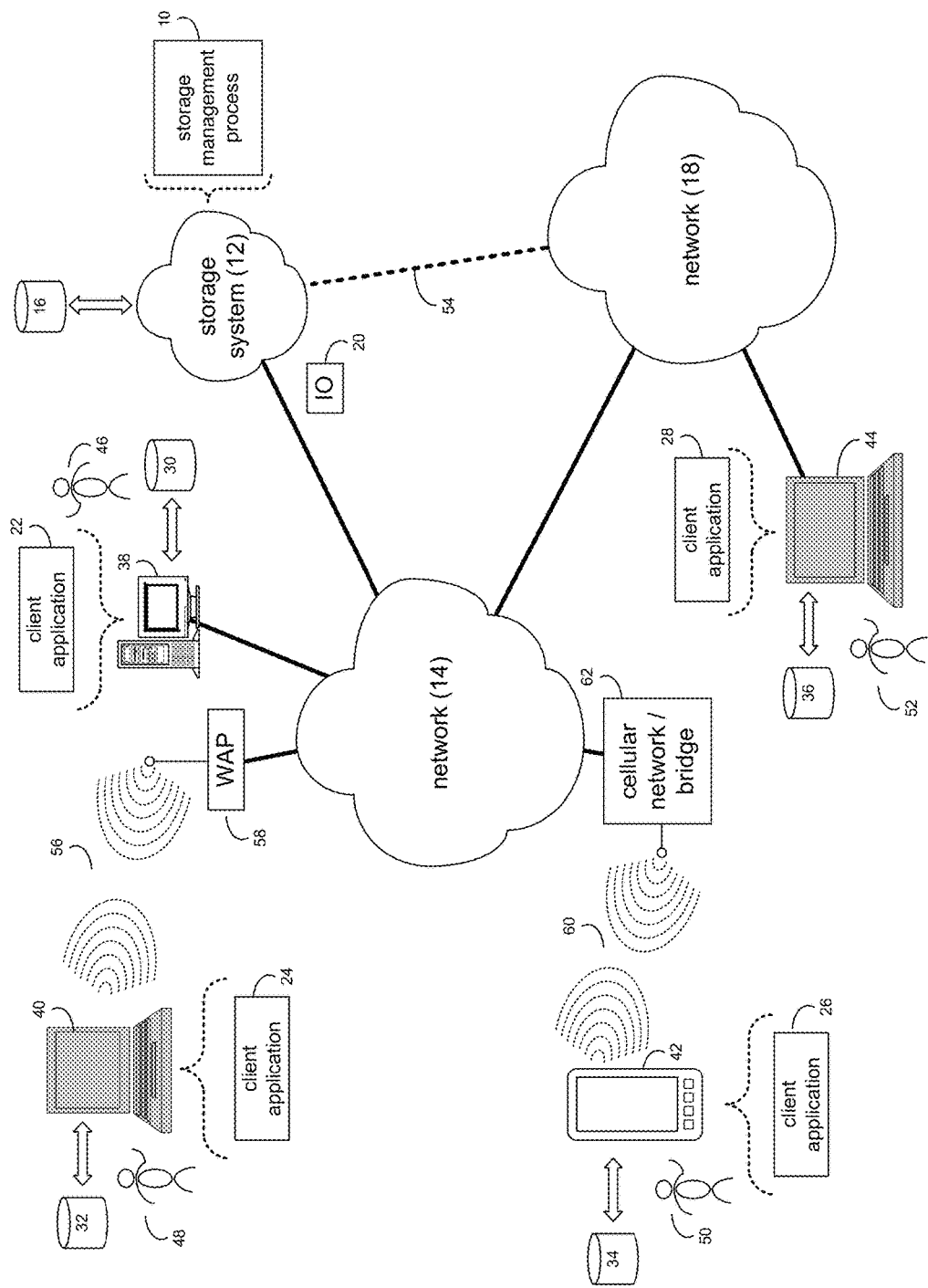
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: a Windows™ operating system; a Linux™ operating system, a Unix™ operating system, an EMC™ operating system, or a custom operating system.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a personal digital assistant (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
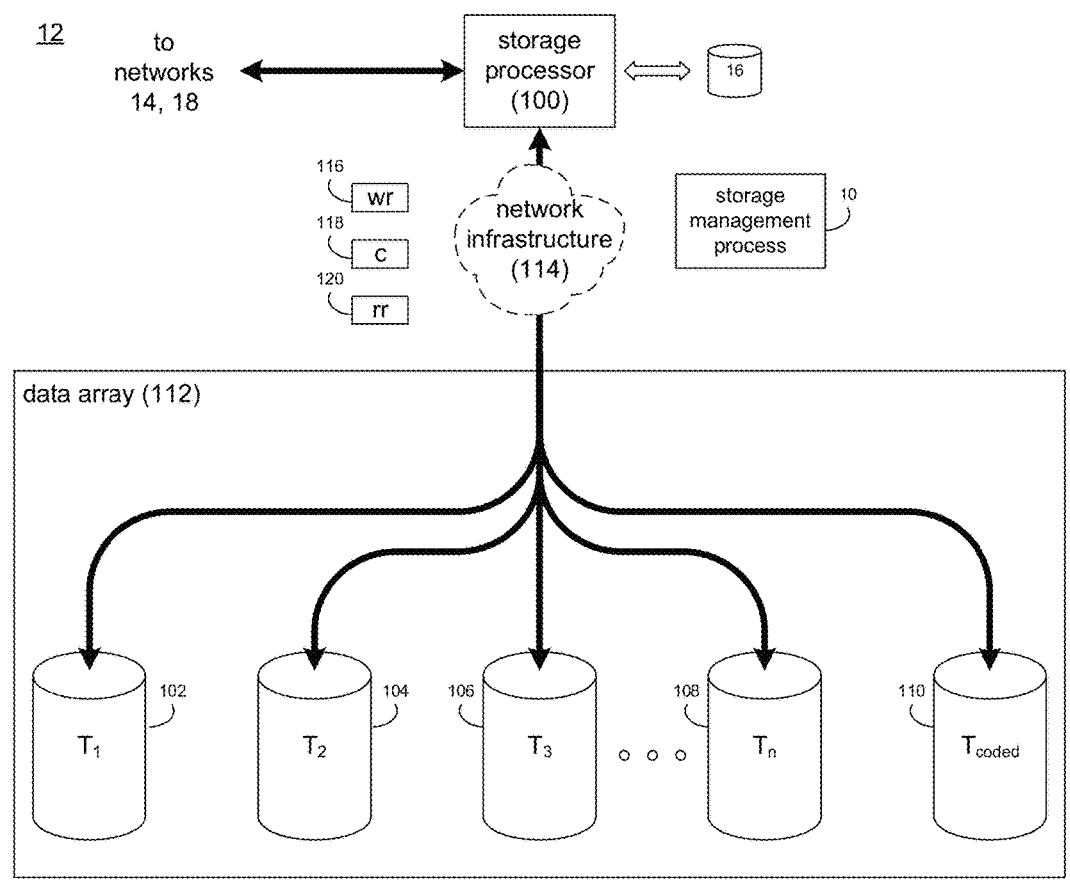
FIG. 2 is a diagrammatic view of the storage system of FIG. 1.

Referring also to FIG. 2, storage system 12 may include one or more storage processors (e.g., storage processor 100) and a plurality of storage targets T (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be an NAS or a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
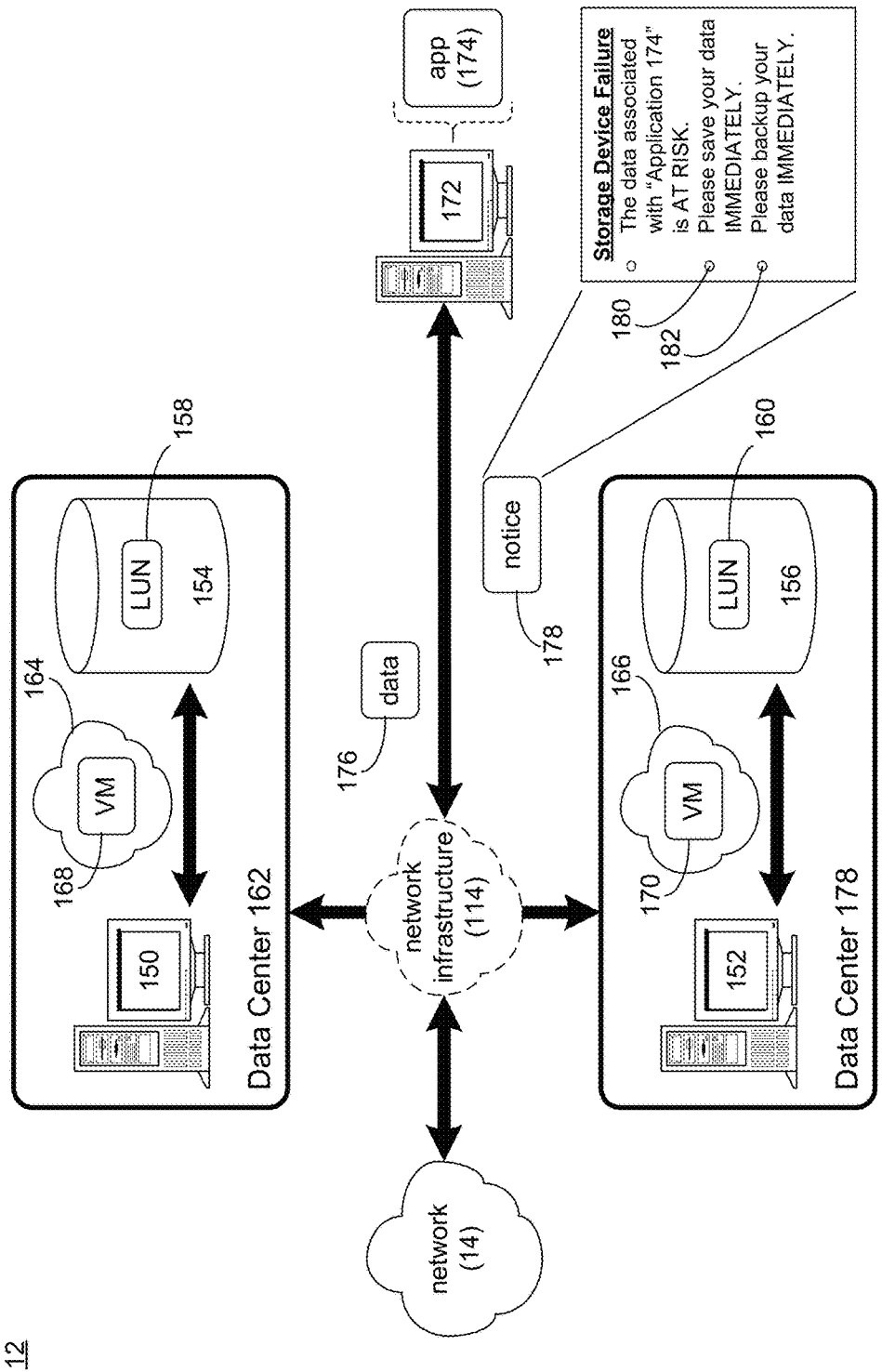
FIG. 3 is another diagrammatic view of the storage system of FIG. 1.

Referring also to FIG. 3, there is shown one manner in which storage system 12 may be configured. In this implementation, storage system 12 may include two or more data servers 150, 152 (e.g., two or more storage processors), wherein data server 150 may be coupled to storage device 154 that may be used to store data written to data server 150. Data server 152 may be coupled to storage device 156 that may be used to store data written to data server 152.

Examples of storage devices 154, 156 may include but are not limited to: a hard disk; a solid state drive; a tape drive; an optical drive; a RAID device (e.g., an NAS device); a data array, and all or a portion of a SAN (e.g., a storage processor coupled to a plurality of storage targets). The various servers (e.g., data servers 150, 152) may execute all or a portion of storage management process 10. The instruction sets and subroutines of storage management process 10, which may be stored on the storage devices (e.g., storage devices 154, 156) coupled to e.g., data servers 150, 152, may be executed by one or more processors (not shown) and one or more memory architectures (not shown) included within e.g., data servers 150, 152.

Data server 150 may be synchronously coupled to data server 152 via, e.g., network infrastructure 114 to provide a high level of availability. For example, data servers 150, 152 may be configured in a mirrored configuration, wherein e.g., any data written to data server 150 may be "mirrored" to data server 152. Alternatively, data servers 150, 152 may be configured in an active/active configuration wherein data written to either of data servers 150, 152 may be replicated onto the other of data servers 150, 152, wherein this data may be written essential immediately to both of data servers 150, 152. Further, data servers 150, 152 may include functionality that may be configured to define and expose one or more logical units (e.g., LUNs 158, 160, respectively) that users of data servers 150, 152 may use and access to store data.

While storage system 12 is described above as including two data servers (e.g., data servers 150, 152), this is for illustrative purposes only and is not intended to be a limitation of this disclosure, as other configurations are possible. For example, storage system 12 may include three or more data servers that all may be synchronously coupled so that all of the data servers may be mirrored or in an active/active arrangement.

One or more of data servers 150, 152 may execute one or more virtual machine operating environments. For example, data server 150 may execute virtual machine operating environment 164 and data server 152 may execute virtual machine operating environment 166. An example of virtual machine operating environments 164, 166 may include but is not limited to a hypervisor, which is an instantiation of an operating system that allows for multiple virtual machines to operate within a single physical device. For example, server computer 150 may be a physical device that may execute virtual machine operating environment 164 (e.g., a hypervisor) and second server computer 152 may be a physical device that may execute virtual machine operating environment 166 (e.g., a hypervisor).

For this example, further assume that virtual machine operating environment 164 within server computer 150 is executing virtual machine 168 and that virtual machine operating environment 166 within server computer 152 is executing virtual machine 170. While virtual machine operating environments 164, 166 are each shown to be executing only a single virtual machine (virtual machines 168, 170, respectively), this is for illustrative purposes only and is not intended to be a limitation of this disclosure, as the number of virtual machines executed within virtual machine operating environment 164, 166 may increase/decrease depending upon need/loading.

The Storage Management Process:

For the following illustrative example, assume that application server 172 is executing application 174. An example of application 174 may include but is not limited to an enterprise level application (e.g., an email application, a database application, a document management application, a time-entry application, a contact management application, an engineering design application, or an ecommerce application). Further, assume for this illustrative example that data servers 150, 152 are configured in an active/active arrangement so that data written to either of data servers 150, 152 may be replicated onto the other of data servers 150, 152, wherein this data may be written essentially immediately to both of data servers 150, 152. Additionally, assume that the data (e.g., data 176) generated by/modified by/associated with application 174 is stored on LUNs 158, 160 defined within storage devices 154, 156 (respectively), due to data servers 150, 152 being configured in an active/active arrangement; wherein LUNs 158, 160 may be accessible via virtual machines 168, 170 (respectively).

Figure 4:
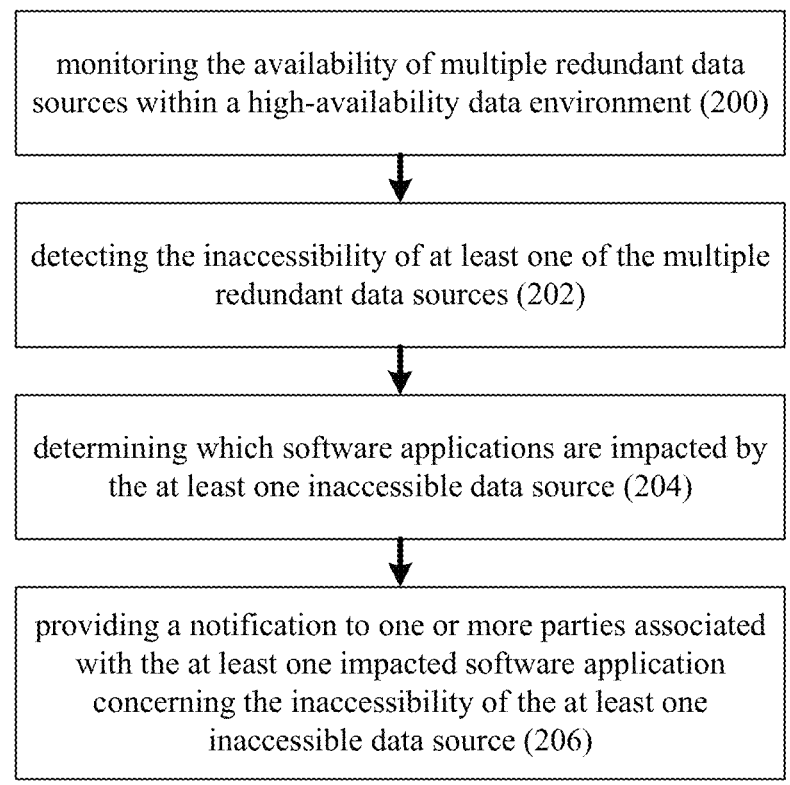
FIG. 4 is a flow chart of one implementation of the storage management process of FIG. 1.

Referring also to FIG. 4, storage management process 10 may be configured to monitor the operation of application 174 to determine whether or not the data (e.g., data 176) generated by/modified by/associated with application 174 is being properly stored on LUNs 158, 160.

Accordingly, storage management process 10 may monitor 200 the availability of multiple redundant data sources (e.g., LUNs 158, 160) within a high-availability data environment (e.g., storage system 12). For example and as discussed above, data 176 (i.e., the data generated by/modified by/associated with application 174) is stored on LUNs 158, 160. Accordingly, storage management process 10 may monitor 200 the availability of LUNs 158, 160 to confirm their availability for storing data 176 associated with application 174.

Assume for illustrative purposes that LUN 160 suddenly becomes unavailable. For example, assume that data center 178 (which houses data server 152 and storage device 156 within which LUN 160 is defined) is the victim of a natural disaster (e.g., a flood) that takes data center 178 out of service, while data center 180 (which houses data server 150 and storage device 154 within which LUN 158 is defined) in unaffected and still available.

Accordingly, storage management process 10 may detect 202 the inaccessibility of at least one of the multiple redundant data sources (e.g., LUN 160), thus defining at least one inaccessible data source (i.e., LUN 160). Accordingly and as a result of this inaccessibility, data servers 150, 152/storage devices 154, 156 are no longer configured in an active/active arrangement, wherein data 176 is written to both data servers 150, 152/storage devices 154, 156. Therefore, data 176 is now vulnerable, since failure of LUN 158 would result in the loss of data 176 (as there is no redundant copy of data 176 on LUN 160).

In response to detecting 202 the inaccessibility of e.g., LUN 160, storage management process 10 may determine 204 which software applications are impacted by the at least one inaccessible data source (namely LUN 160), thus defining at least one impacted software application. In this particular illustrative example, the impacted software application is e.g., application 176.

Once the impacted software application (e.g., application 176) is determined 204, storage management process 10 may provide 206 a notification (e.g., notification 178) to one or more parties associated with the at least one impacted software application (e.g., application 176) concerning the inaccessibility of the at least one inaccessible data source (e.g., LUN 160). Notification 178 may define how the inaccessibility of LUN 160 impacts application 176 (i.e., the impacted software application) and may include one or more data preservation recommendations (e.g., recommendations 180, 182) concerning LUN 160 (i.e., the inaccessible data source).

Examples of the parties associated with the impacted software application (e.g., application 176) may include but are not limited to one or more of: users (e.g., user 46) of application 176 (i.e., the impacted software application); administrators (e.g., user 48) of application 176 (i.e., the impacted software application); administrators (e.g., user 50) of LUN 160 (i.e., the at least one inaccessible data source); and administrators (e.g., user 52) of storage system 12 (i.e., the high-availability data environment).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   monitoring the availability of multiple redundant data sources within a high-availability data environment;
   detecting the inaccessibility of at least one of the multiple redundant data sources, thus defining at least one inaccessible data source;
   determining which software applications are impacted by the at least one inaccessible data source, thus defining at least one impacted software application; and
   providing a notification to one or more parties associated with the at least one impacted software application concerning the inaccessibility of the at least one inaccessible data source, wherein the notification identifies the at least one impacted software application and wherein the notification defines how the at least one inaccessible data source impacts the at least one impacted software application including how data associated with the at least one impacted software application is vulnerable based upon, at least in part, the at least one inaccessible data source.

2. The computer-implemented method of claim 1 wherein the one or more parties associated with the at least one impacted software application includes one or more of:
   a user of the impacted software application;
   an administrator of the impacted software application;

an administrator of the at least one inaccessible data source; and an administrator of the high-availability data environment.

3. The computer-implemented method of claim 1 wherein the notification includes one or more data preservation recommendations concerning the at least one impacted software application.

4. The computer-implemented method of claim 1 wherein the multiple redundant data sources are accessible via one or more virtual machine systems operating within the high-availability data environment.

5. The computer-implemented method of claim 1 wherein at least one of the multiple redundant data sources is a LUN within the high-availability data environment.

6. The computer-implemented method of claim 1 wherein the multiple redundant data sources are located in different data centers within the high-availability data environment.

7. A computer program product residing on a non-transitory computer readable medium having a plurality of instructions stored thereon which, when executed by a processor, cause the processor to perform operations comprising:

monitoring the availability of multiple redundant data sources within a high-availability data environment;

detecting the inaccessibility of at least one of the multiple redundant data sources, thus defining at least one inaccessible data source;

determining which software applications are impacted by the at least one inaccessible data source, thus defining at least one impacted software application; and providing a notification to one or more parties associated with the at least one impacted software application concerning the inaccessibility of the at least one inaccessible data source, wherein the notification identifies the at least one impacted software application and wherein the notification defines how the at least one inaccessible data source impacts the at least one impacted software application including how data associated with the at least one impacted software application is vulnerable based upon, at least in part, the at least one inaccessible data source.

8. The computer program product of claim 7 wherein the one or more parties associated with the at least one impacted software application includes one or more of:

a user of the impacted software application;

an administrator of the impacted software application;

an administrator of the at least one inaccessible data source; and an administrator of the high-availability data environment.

9. The computer program product of claim 7 wherein the notification includes one or more data preservation recommendations concerning the at least one impacted software application.

10. The computer program product of claim 7 wherein the multiple redundant data sources are accessible via one or more virtual machine systems operating within the high-availability data environment.

11. The computer program product of claim 7 wherein at least one of the multiple redundant data sources is a LUN within the high-availability data environment.

12. The computer program product of claim 7 wherein the multiple redundant data sources are located in different data centers within the high-availability data environment.

13. A computing system including a processor and memory configured to perform operations comprising:

monitoring the availability of multiple redundant data sources within a high-availability data environment;

detecting the inaccessibility of at least one of the multiple redundant data sources, thus defining at least one inaccessible data source;

determining which software applications are impacted by the at least one inaccessible data source, thus defining at least one impacted software application; and providing a notification to one or more parties associated with the at least one impacted software application concerning the inaccessibility of the at least one inaccessible data source, wherein the notification identifies the at least one impacted software application and wherein the notification defines how the at least one inaccessible data source impacts the at least one impacted software application including how data associated with the at least one impacted software application is vulnerable based upon, at least in part, the at least one inaccessible data source.

14. The computing system of claim 13 wherein the one or more parties associated with the at least one impacted software application includes one or more of:

a user of the impacted software application;

an administrator of the impacted software application;

an administrator of the at least one inaccessible data source; and an administrator of the high-availability data environment.

15. The computing system of claim 13 wherein the notification includes one or more data preservation recommendations concerning the at least one impacted software application.

16. The computing system of claim 13 wherein the multiple redundant data sources are accessible via one or more virtual machine systems operating within the high-availability data environment.

17. The computing system of claim 13 wherein at least one of the multiple redundant data sources is a LUN within the high-availability data environment.

* * * * *